United States Patent [19]

Bottero

[11] Patent Number: 5,114,724
[45] Date of Patent: May 19, 1992

[54] MULTI-COLOR PASTA PRODUCTS

[75] Inventor: Fabrizio Bottero, Greenwich, Conn.

[73] Assignees: Patrick Nugent, Weston; Richard W. Egan, Wellesley Hills, both of Mass.

[21] Appl. No.: 703,914

[22] Filed: May 22, 1991

[51] Int. Cl.$^5$ ................................................ A23L 1/16
[52] U.S. Cl. ...................................... 426/249; 426/250; 426/540; 426/557; 426/451
[58] Field of Search ............... 426/249, 250, 540, 557, 426/451

[56] References Cited

U.S. PATENT DOCUMENTS

| | | | |
|---|---|---|---|
| 2,264,115 | 11/1941 | Grainger et al. | 426/92 |
| 2,858,217 | 10/1958 | Benson | 426/249 |
| 3,482,992 | 12/1969 | Benson | 426/249 |
| 3,582,353 | 6/1971 | Fehr, Jr. et al. | 426/250 |
| 3,804,637 | 4/1974 | Rejsa | 99/450.1 |
| 3,925,561 | 12/1975 | Herstel et al. | 426/250 |
| 4,816,281 | 3/1989 | Moriyama et al. | 426/457 |
| 4,835,000 | 5/1989 | Kehoe | 426/516 |
| 4,840,808 | 6/1989 | Lee et al. | |
| 4,874,619 | 10/1989 | Leonardo et al. | 426/94 |
| 4,940,593 | 7/1990 | Duffy | 426/94 |

FOREIGN PATENT DOCUMENTS

| | | | |
|---|---|---|---|
| 0117955 | 9/1984 | European Pat. Off. | 426/557 |
| 0041580 | 9/1985 | Japan | 426/557 |

*Primary Examiner*—Jeanette Hunter
*Attorney, Agent, or Firm*—Scully, Scott, Murphy & Presser

[57] ABSTRACT

Multi-colored pasta pieces exhibit at least two colors, one of which may be the color of conventional untinted pasta. The added color preferably forms a striped or checkered pattern on the pasta, and extends through the pasta.

11 Claims, No Drawings

MULTI-COLOR PASTA PRODUCTS

The present invention relates to edible food products, in particular to any of the conventional types of pasta products available in the form of substantially flat sheets or curled, tubular, folded and/or stuffed pasta products.

BACKGROUND OF THE INVENTION

As efforts continue to present food in distinctive, pleasing forms, attempts have occasionally been made to use color to enhance the appearance of food products. Such efforts have generally met with little or no success, sometimes because the result has not necessarily been appetizing to look at, but also because the available techniques for introducing color into food products have been rather limited in the types of variations that can be introduced and in the types of foods that can be treated.

With the increasing general awareness of nutrition, food products generally known as pasta have enjoyed a considerable increase in popularity and consumption. However, prior to the discovery which is the subject of this application, only a very limited number of techniques have become known for introducing interesting, attractive varieties of colors into pasta products. Perhaps the best known of these has been simply altering the color of an entire pasta piece so that it remains one uniform color. An example of this approach is spaghetti and noodles given a green color in their entirety. This product affords the opportunity to produce a mixed color effect by preparing and serving a dish comprising a mixture of pasta pieces some of which are entirely green and the remainder of which are the usual white or off-white color associated with uncolored pasta. However, pasta pieces in which each piece contains more than color have not been known prior to the present invention, even though such a product would seem to be of potential interest.

SUMMARY OF THE INVENTION

According to the present invention, a pasta product comprising a sheet of pasta is characterized in that its outer surfaces exhibit two or more colors and is further characterized in that each color extends through said sheet to the opposite surface thereof. Embodiments of this invention include pasta products in sheet form per se, for instance, noodles, useful in producing layered products (i.e., lasagna), and products formed using such sheets or using pieces cut from such sheets. As will be described more fully below, products comprising the invention have two or more colors, one of which may be the characteristic neutral color of pasta, and the color or colors will preferably be present in the form of one or more bands of color.

DETAILED DESCRIPTION OF THE INVENTION

As indicated, the present invention is a pasta product comprising a sheet in flat form. By "sheet" is also meant products formed in one or more operation carried out on a flat piece or a portion cut from a flat sheet, to form into any of a variety of pasta products. By "pasta product" is meant herein flat sheets, such as wide or narrow noodles, as well as the entire variety of products customarily formed heretofore from sheets of uncolored pasta, including but not limited to stuffed shells, manicotti, lasagna, or ravioli having any desired edible filling (i.e., vegetable, cheese, dough, meat, fish and mixtures thereof). It will also be apparent that the present invention applies to the pasta products in the prepared, uncooked form, and in the cooked form.

To prepare the products of the present invention, one begins with separate preparations having different colors. In this sense, conventional pasta having the well-known white or off-white color is considered to have a "color". Thus, the beginning preparations can include one preparation having the conventional color and a second preparation having a different color, or additional beginning preparations each having a different color, or can comprise preparations to each of which coloring agents of different color have been added so that none of the beginning preparations retains the conventional white or off-white color.

The basis for each beginning preparation is a conventional mixture comprising glutenous flour. The requirement for the flour is that it provide a self-supporting paste upon mixture with a small amount of water and the other desired components desired below. Such a self-supporting paste should also preferably retain its original form, texture and color at ambient conditions. The preferred flour is durum flour. Semolina flour, including those known as high grade semolina and low grade semolina, are also considered glutenous flours useful in the present invention. In any event, any flour conventionally used in the preparation of pasta can be used in the present invention and those skilled in this art will recognize other similar flours that may be useful.

The beginning preparations will also contain small but effective amounts of other ingredients well within the skill of the preparer. For instance, small amounts of cooking oil and water should be present. The amounts present should be sufficient to moisten the starting preparation to give the flour cohesiveness without making the preparation so viscous that it cannot be rolled or pressed, but should not be so high that the preparation is no longer shape-sustaining. While the exact amounts can vary somewhat within these functional limits, typical amounts will be about two teaspoons of oil for every five cups of flour, and about four cups of water for every five cups of flour. If desired, small amounts of salt (on the order of one teaspoon per five cups of flour) and of seasoning, if desired, can also be added to the preparation.

Thus, each color is in the form of a band whose width is at least the minimum width that can be prepared as a distinct lengthwise strip of colored pasta, that is, at least about one-sixteenth or one-eighth of an inch wide. Preferably, each band is at least about a quarter of an inch wide and can be as much as 1, 2 or more inches wide. The pasta product of the present invention is also free of voids.

A coloring agent is also added to the one or more beginning preparations that will exhibit color other than the conventional off-white color of pasta. As will be appreciated, the coloring agent must be edible and non-deleterious to the consumer. Preferred coloring agents are those derived directly from other foods, although synthetic, government-approved coloring agents are also known and useful in the present invention. Examples of preferred coloring agents include tomato powder to impart a red color; spinach powder to impart a green color; squid ink to impart a black color; ground mushroom to impart a brown color; and egg or egg yolk to impart a yellow color. Of course, combinations of coloring agents can be formulated to create other desired coloring agents. One advantage of the products according to this invention is that they are nutritious and can be cholesterol-free.

The desired coloring agent is then added to one or more of these separate beginning preparations, in amounts effective to produce the desired intensity of the color. Amounts on the order of 1.5 cups of coloring agent per five cups of flour are generally satisfactory, although of course more or less coloring agent can be added as desired.

The beginning preparations are then stirred until all ingredients in each preparation are uniformly dispersed within the preparation. Each preparation is then rolled out flat, preferably to a relatively coarse thickness on the order of ¼" to ¾", and cut into strips of any width desired, depending on the desired width of the strip of that color in the final pasta product. The strips should have straight, parallel edges.

Next, the strips of the two or more various colors are assembled to create a preform pasta sheet. These strips are placed side by side with their adjacent edges in contact throughout the length of the strips. If desired, a very small amount of moisture can be placed along the adjacent edges to improve their cohesion. However, it is a significant advantage of this invention that the starting preparations have a degree of moistness which enables them readily to cohere to the adjacent edges without any need for additional moisture or other cohesion aids. The assembly can be carried out by hand, or with a suitably equipped machine to which the strips are fed and which aligns the strips and presses them together laterally.

The preform then undergoes an additional step or steps in which its thickness is reduced to the final desired thickness, which generally will be ⅛" or less, preferably about 1/16" or less. The compression can be carried out entirely by hand, or in a machine equipped with rollers of the type permitting such preforms to be placed between the rollers; preferably such machines have the capacity to adjust the distance between rollers, and thus the thickness of the product produced in the rolling/compressing operation. Preferably, the reduction of the thickness of the preform is carried out in a series of successive steps, in which the thickness is gradually reduced pass by pass until it reaches the final desired thickness. Employing a series of thickness reduction steps is considered advantageous to protect the integrity of the product.

It is a significant and surprising discovery that when the multi-colored pasta product is prepared in this way, the lines defined by the adjacent edges of different colored strips remain sharp and discrete throughout the thickness reducing step and thereafter. This is believed to distinguish the product of the present invention from products in which a coloring agent is simply applied to the surface of a conventional pasta sheet, since a product prepared in such a manner would exhibit an uneven, wavy line between the colored and uncolored portions of the sheet. The resulting sheet will exhibit at least one different color, which will be in the form of a band having two straight, parallel edges.

It will be noted that the sheets prepared as described herein will contain one color through the thickness of the sheet. This is believed to contribute to the color integrity and fidelity and the overall attractiveness of the product, since it eliminates the possibility that uncolored pasta beneath the colored surface might bleed through or otherwise dilute the visual impact of the desired coloring agent, especially on cooking. Preparation of the product in this way produces a more uniform color, straighter, and better defined lines, and is easier to carry out, than adding colorant after the sheet has been formed.

The sheet produced in the thickness reducing step can then be treated in any of a number of ways, essentially analogously to the ways in which a conventional uncooked sheet of pasta can be treated to produce a final desired pasta product. For instance, a desired geometric shape can be cut out of the multi-colored pasta sheet, to produce interesting shapes which can then be cooked as is or can be folded over on themselves, perhaps to enclose an edible filling. Alternatively, two pieces of like geometrical shapes can be cut out of the sheet, a portion of edible filling placed on one such portion, the other portion placed over the filling and the abutting edges of the two portions crimped together to form, for instance, a ravioli piece.

Alternatively, the sheet produced as described above can be cut into new strips, along lines perpendicular to the lines formed by the adjacent edges of the original strips, and the new strips realigned so that an edge of one color on one strip is immediately adjacent an edge of an alternate color on the other strip. Preferably, the new strips are cut so that their width is approximately equal to the width of the colored strips produced in the original series of steps. Thus, a new preform is created which has a checkered appearance. The checkered preform is then compressed to create a final pasta product having a checkered appearance. In another embodiment of the present invention, a multi-stripe or checkered sheet is placed on top of a sheet of conventional, uncolored pasta. The two sheets are then pressed or laminated together to form a new sheet which can also be cut into a variety of shapes useful as is or useful in making a stuffed piece such as ravioli, in which the multi-colored surface is on the exterior.

It will be appreciated in the foregoing description that a sheet can be produced containing but one band of color surrounded on both sides by the remainder of the sheet which is in a second color or in the customary off-white color free of any additional coloring agent. It will also be appreciated that beginning preparations of two different colors can be employed to produce alternating strips of the two colors, in which all the strips are of the same widths, are of different widths or of varying widths. It will further be appreciated that beginning preparations of more than two different colors can be employed and incorporated into final products exhibiting as many bands as desired. Preferably, the various colors will take the form of bands on the surface of the pasta sheet, in which the edges of each band are straight and parallel and the edges of bands of different colors are parallel to each other.

The invention will be described in the following example, which is included here for purposes of illustration and is not to be taken as limiting the invention in any way:

EXAMPLE

Two starting pasta preparations were prepared, having the following ingredients:

| Ingredients | Preparation A | Preparation B |
| --- | --- | --- |
| durum wheat | 5 cups | 5 cups |
| spinach powder | — | 1.5 cups |

| Ingredients | Preparation A | Preparation B |
| --- | --- | --- |
| (coloring agent) | | |
| salt | 1 tsp. | 1 tsp. |
| cooking oil | 2 tsp. | 2 tsp. |
| water | 4 cups | 4 cups |

Preparations A and B were separately, thoroughly stirred until all ingredients were uniformly dispersed therein. Preparation A had the conventional off-white color associated with pasta, and Preparation B was green in color. Each preparation was then rolled out, to a thickness of about ¼". The rolled out preparations were each cut into strips ¾" wide. The strips were found to be sufficiently cohesive so that with normal careful handling they did not break apart when they were separated from each other. The strips were then assembled into a preform, by placing strips of alternate colors side by side with their edges in contact with each other throughout the entire lengths of the strips. The preform was then compressed, to reduce its final thickness to about 1/16", with compression being carried out by rolling. The sheet thus produced had repeating alternating stripes, with the lines defined between each stripe parallel, straight and well-defined. The sheet thus produced could be used to produce noodles, lasagna, and any other desired pasta shape.

What is claimed is:

1. A pasta product comprising a substantially flat sheet of pasta having outer surfaces of two or more colors, wherein each color extends uniformly through said sheet to the opposite surface thereof.

2. A pasta product according to claim 1 in the form of two sheet portions joined at their respective edges to form a pocket, containing edible material in the pocket.

3. A pasta product according to claim 1 wherein at least one of said colors is in the form of two or more bands having substantially straight, parallel sides wherein all bands of a color are parallel to each other.

4. A pasta product according to claim 1 wherein each of two or more of said colors is in the form of at least one band having substantially straight, parallel sides.

5. A pasta product according to claim 1 wherein each of two or more of said colors is in the form of two or more bands having substantially straight, parallel sides wherein all bands of a color are parallel to each other.

6. A pasta product according to claim 1 wherein said colors form a checkered pattern on said outer surface.

7. A pasta product comprising a sheet according to claim 1 laminated to a sheet of pasta of one color.

8. A method of producing a pasta product according to claim 1 comprising the steps of
   (a) providing a plurality of strips of pasta, at least one strip consisting entirely of a color different from the other strips,
   (b) aligning said strips in side-by-side relation with their adjacent edges in contact along their entire length, thereby forming a preform, and
   (c) compressing the preform to reduce its thickness.

9. The method of claim 8 wherein the compressing step comprises at least two successive steps in which the thickness is reduced.

10. The method of claim 8 wherein the thickness of the preform is above about one eighth of an inch and the preform is compressed to a thickness below about one eighth of an inch.

11. A method for producing a pasta product exhibiting a checkered pattern on its outer surface, comprising the steps of
   (a) providing a plurality of strips of pasta, at least one strip exhibiting a color different from other strips,
   (b) aligning said strips in side-by-side relation with their adjacent edges in contact along their entire length, thereby forming a preform,
   (c) cutting the preform formed in step (b) along parallel lines perpendicular to the edges of said strips, the distance between said lines being equal to the width of said strips, thereby forming new strips which exhibit alternating colors,
   (d) aligning said new strips in side-by-side relation with their adjacent edges in contact along their entire length, and with edges of one color on one strip in contact with edges of a different color on adjacent strips, thereby forming a checkered preform, and
   (e) compressing the checkered preform to reduce its thickness.

* * * * *